UNITED STATES PATENT OFFICE.

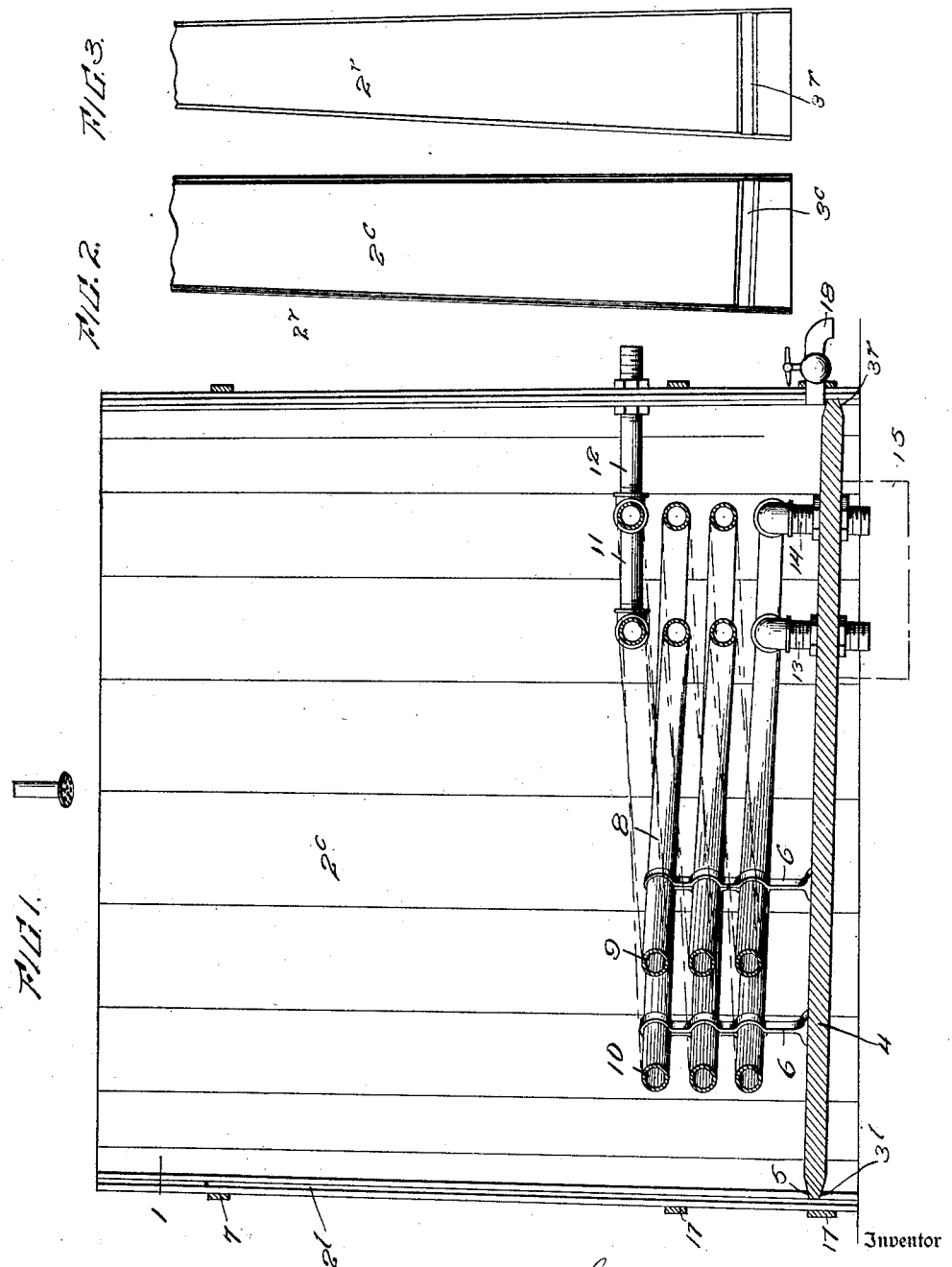

GEORGE R. FIELDS, OF TERRE HAUTE, INDIANA, ASSIGNOR TO THE FIELDS COMPANY, A CORPORATION OF INDIANA.

APPARATUS FOR MAKING CATSUP.

1,107,161. Specification of Letters Patent. Patented Aug. 11, 1914.

Application filed February 10, 1914. Serial No. 817,860.

*To all whom it may concern:*

Be it known that I, GEORGE R. FIELDS, a citizen of the United States, residing at Terre Haute, in the county of Vigo and State of Indiana, have invented certain new and useful Improvements in Apparatus for Making Catsup; and I do hereby declare the following to be a full, clear, and exact description of the invention, such as will enable others skilled in the art to which it appertains to make and use the same.

This invention relates to apparatus for cooking vegetable pulp, particularly catsup by such a process as is described in my pending application bearing Serial Number 816,118, filed February 2, 1914, and an object of the invention is to provide a sanitary apparatus, the container portion of which is formed of some material such as wood, as will not affect the natural color of the vegetable pulp.

A further object of the invention is to provide a heating element of such a nature as will enable the operator to apply to the pulp a heat considerably above the boiling point of water and to apply this heat from within a wooden tank.

A still further object of the invention is to provide an apparatus which will make it possible to check the boiling over of the vegetable pulp and thus to retain the natural coloring matter of the pulp.

A still further and more particular object of the invention is to provide a wooden vat of peculiar construction having a one-piece bottom so arranged as to allow the contents to discharge by gravity.

With these and other objects in view, the invention consists in certain novel constructions, combinations and arrangements of the parts as will be hereinafter more fully described, and then specifically pointed out in the claims.

In the drawings, where similar reference characters designate corresponding parts, and wherein one adaptation of the invention is shown, Figure 1 is a vertical central section through the vat; Figs. 2 and 3 are details of staves used to make the vat as will be described in detail hereinafter.

The tomato and other vegetable pulp boiling kettles and vats which are now in use are for the most part made of metal and heated from without and they are usually provided with a double bottom which construction destroys the natural color of the pulp due to the metal vat, consumes an unnecessary amount of time in boiling the material due to the fact of being heated from without and become contaminated due to the remaining in the crevices formed in the false bottoms of small quantities of vegetable pulp which portions cannot be readily removed from the vat while the same is being cleaned and which subsequently decay and foster germs which permeate the next mass of pulp which is to be cooked.

The present invention aims to overcome these difficulties and objections by providing a wooden vat having steam coils therein arranged upon the one-piece sloping bottom.

In order that the invention may be more fully understood, reference is to be had to the accompanying drawings.

The wooden vat used for boiling the vegetable pulp and shown generally at 1 comprises a number of staves or sections, the staves at the left center and right as shown in Fig. 1 being numbered $2^l$, $2^c$ and $2^r$ respectively.

By referring to Figs. 2 and 3, it will be seen that these staves are tapered so as to be of less width at the top than at the bottom and they are also provided with tongue and grooves as is common practice for affording a close fit between the staves. These staves are made preferably of wood of any variety and are made in most respects like ordinary tapered vats. The lower ends of the staves $2^l$, and $2^r$ are provided with grooves $3^l$ and $3^r$ respectively, these grooves being tapered as seen best in Fig. 1 and the center line of the grooves is substantially perpendicular to the long axis of the stave. The stave shown at $2^c$ in Fig. 1 is shown in detail in Fig. 2 and is seen to have a groove $3^c$ at an angle other than a right angle to the long axis of the stave $2^c$.

It will be understood that the groove $3^c$ on the central stave as seen in Fig. 1 will be more oblique than any of the other grooves inasmuch as the staves to either side of this central stave will have their grooves disposed more nearly at right angles to the long axis of the stave. The staves are so arranged that the grooves of adjacent staves are contiguous and form a complete slot around the bottom of the vat, the plane of the slot being oblique to the vertical axis of the vat.

In order to close the lower end of the vat, there is provided a bottom 4, the periphery of which is tapered as at 5 to conform generally to the grooves just described and in practice, it is found that although the bottom 4 is disposed oblique with respect to a horizontal line the bottom is made circular in form, although, of course, if the pitch of the bottom were to be made greater it might be desirable to make the latter elliptical. It will be seen that this bottom comprises a single piece wherein the groove is substantially in a plane with the sides of the bottom so that no grooves are formed within which vegetable pulp may be lodged.

By means of supports 6 secured in any approved manner to the bottom 1 is supported the heating element indicated generally at 8. This element comprises a pair of coils, one concentric with the other, the inner coil 9 being spaced from the outer coil 10 by a distance approximately equal to the distance from the outer coil 10 to the vat 1. There may be provided as many convolutions of these coils as are necessary and any suitable means may be employed for supplying the same with steam, but I have shown in the drawings a coupling 11 passing from the coil 9 to a point without the vat, while coupling 12 connects the coil 10 to another point without the vat, the two coils being fed from the same source of steam so as to have the coils of the same temperature or may be fed by steam of different pressures so as to have one coil at a temperature different from the other. Coil 9 has a coupling 13 which passes through the bottom while coil 10 has a coupling 14 passing through the bottom 4 and these couplings 13 and 14 which form the outlet for the condensed water may be connected to a steam trap 15 of any approved design and forming no part of the present invention. After the vat has been assembled and the bottom 4 is in place, the coils are mounted upon the supports 6 and the couplings 11 and 12 passed through the sides of the vat while couplings 13 and 14 passed through the bottom and suitable packing employed for preventing the escape of steam, while if found necessary, of course, additional packing such as is commonly known in the art may be employed to prevent charring of the wood around the inlet and outlet pipes. Before the coils which may be made of any suitable material such as copper, are placed in a vat, they are given a coat of block tin. This coating of the coils with block tin is designed to close up all the openings and crevices within which vegetable pulp might lodge. It is designed under normal working conditions to supply coils with steam at a pressure approximately eighty pounds to the square inch, but of course, I am not limited to the use of steam at this pressure, but when this pressure is used the coils will be at a temperature somewhat over three hundred degrees F. from which it will be understood that the pulp will be almost immediately boiled so that less time is required to heat the pulp than would be the case if heat were applied from the outside of the vat. It will also be understood that coils of this temperature might have a deteriorating effect upon wood if some comparatively dense medium for consuming heat were not interposed between the heating coils and wooden vat (vegetable pulp), but it will be seen that the coils are spaced from the sides and bottom of the vat and it is possible to use a heating element of rather high temperature in a wooden vat by reason of this spacing of the coils on the wooden structure. Of course, the spacing of the coils as shown, also admits of free boiling of the pulp.

In the boiling of vegetable pulp, especially tomato catsup, it is common experience that when the catsup first boils up the natural coloring matter which forms one of the lighter constituencies of the pulp rises to the top of the cooking mass and if some means is not provided for preventing the boiling over of the pulp, this coloring matter will be lost. In order to check the boiling over I spray water over the catsup and I have shown at 16 a convenient water sprayer which may be fed from any source of water not shown and may be supported in any way. The method of mounting this sprayer 16 is of little consequence, but it is desirable that the same be located in a position central with respect to the vat when the water is sprayed. Aside from cooling the top surface of the boiling mass and thereby checking the boiling over the cold water carries down into the boiling mass the coloring matter in its path so that the natural coloring material is preserved. It will be seen that this sprayer acts in conjunction with the wooden staves forming the vat for preserving the natural color of the cooking pulp. In order to hold the staves together, there are provided hoops 17, the lowermost hoop as shown in Fig. 1 having the center thereof below groove in stave $2^l$ while the center of the same hoop is above the center of the groove in stave $2^r$, this arrangement making it possible to keep a pressure between the staves and the bottom. In order that the materials may be withdrawn from the interior of the vat, there is provided a stop cock 18 substantially as shown in Fig. 1 and it is to be understood that any other form of stop cock may be used. If desirable that portion of the lowermost hoop 17 which is adjacent the cock 18 may be enlarged.

I claim:

1. A vat for evaporating vegetable pulp comprising walls made of a plurality of staves, the lower ends of the staves being grooved on their inner surfaces, said grooves in adjacent staves being contiguous, the plane of the groove being oblique to the axis of the vat and a bottom formed of a planate member having the periphery thereof located within the grooves, and means adjacent the lowest point of the bottom for drawing off the contents of the vat.

2. A vat for evaporating vegetable pulp comprising a plurality of staves adapted to lie adjacent each other to form a closed wall, the lower inner ends of each of said staves being provided with a groove, the grooves of adjacent staves being contiguous, the plane of the grooves being oblique to the vertical axis of said closed wall, a single bottom member conforming to the said wall having the periphery thereof located within the grooves, and means located adjacent the lowest portion of the bottom adapted to pass the contents of the vat.

3. A vat for evaporating vegetable pulp, comprising a wall provided upon the inner lower sides thereof with a groove, the plane of said groove being oblique with respect to a horizontal plane and a planate member forming the bottom and having the periphery thereof received by the groove, and means for passing the contents of the vat, said means located adjacent the lowest portion of the bottom.

4. In an apparatus for cooking vegetable stock, the natural coloring matter of which rises to the surface of the stock when the latter boils, a wooden tank, a heating element located within the tank and adjacent the bottom thereof, and means to spray a liquid into the tank when the vegetable pulp is boiling.

In testimony whereof I affix my signature in presence of two witnesses.

GEORGE R. FIELDS.

Witnesses:
  ROBT. T. LANG,
  W. H. WAKEFIELD.

---

Copies of this patent may be obtained for five cents each, by addressing the "Commissioner of Patents, Washington, D. C."